United States Patent
Delorme

(10) Patent No.: US 7,032,613 B2
(45) Date of Patent: Apr. 25, 2006

(54) CONNECTOR FOR AN INFLATION DEVICE COMPATIBLE WITH SEVERAL TYPES OF VALVE

(75) Inventor: Alain Delorme, Sury aux Bois (FR)

(73) Assignee: ZEFAL, Jargeau (FR)

( * ) Notice: Subject to any disclaimer, the term of this patent is extended or adjusted under 35 U.S.C. 154(b) by 337 days.

(21) Appl. No.: 10/462,746

(22) Filed: Jun. 17, 2003

(65) Prior Publication Data

US 2003/0234042 A1    Dec. 25, 2003

(30) Foreign Application Priority Data

Jun. 21, 2002  (FR)  .................................. 02 07702

(51) Int. Cl.
*F16K 15/20*    (2006.01)

(52) U.S. Cl. ...................... 137/231; 137/223
(58) Field of Classification Search ................ 137/223, 137/231, 269, 270
See application file for complete search history.

(56) References Cited

U.S. PATENT DOCUMENTS

| | | | | |
|---|---|---|---|---|
| 3,926,205 A | * | 12/1975 | Gourlet | 137/223 |
| 3,997,195 A | | 12/1976 | Bartholomew | |
| 5,819,781 A | | 10/1998 | Wu | |
| 5,975,109 A | | 11/1999 | Wu | |
| 5,983,920 A | * | 11/1999 | Gapinski et al. | 137/231 |
| 6,073,645 A | * | 6/2000 | Wu | 137/231 |
| 6,105,600 A | * | 8/2000 | Wang | 137/231 |
| 6,146,116 A | | 11/2000 | Wu et al. | |
| 6,220,273 B1 | | 4/2001 | Wu | |

* cited by examiner

*Primary Examiner*—John Rivell
(74) *Attorney, Agent, or Firm*—Young & Thompson

(57) ABSTRACT

Connector (100) to automatically connect an inflation device to a valve, comprising a hollow stopper (8) to operate elements for opening the valve and an elastically deformable seal (3), characterised in that the seal has a lip (35) designed to:
- immobilize the stopper during inflation, if the aforementioned valve is of a first type; or
- deform to form a seal around the valve during inflation if the aforementioned valve is of a second type. This connector is particularly suitable for fitting to a bicycle pump.

20 Claims, 3 Drawing Sheets

CONNECTOR FOR AN INFLATION DEVICE COMPATIBLE WITH SEVERAL TYPES OF VALVE

BACKGROUND OF THE INVENTION

The present invention relates to a connector for an inflation device compatible with several types of valve without manual intervention, in particular for a bicycle pump type inflation device.

DESCRIPTION OF THE RELATED ART

Several types of valve are used for inflating bicycle tyres. In particular, two types are commonly used and are known by the name of "Bicycle-type" valves (Presta) and "Car-type" valves (Schrader). Bicycle-type valves are small diameter valves (corresponding to an approximately 6.5 mm rim hole) defined by French standard NF R99-035 of May 1974, used particularly for bicycles known as racing bicycles, with narrow rims. Car-type valves have a larger diameter (corresponding to an approximately 9 mm rim hole), are defined by French standard NF R99-031 of May 1974, and are used particularly for mountain bikes, mopeds and cars. In addition to their form, these valves also function differently.

Several devices exist to inflate tyres fitted with one of these valves. However, these devices have the drawback that the type of valve must be determined in advance and the device must then be adjusted to fit the type of valve used by a deliberate action on the part of the user, for example changing or adjusting a connection means on the valve. Pump users require pumps fitted with "intelligent" connection means, i.e. connectors that allow the user to fit the pump without concerning himself with the type of valve that a tyre is fitted with.

SUMMARY OF THE INVENTION

The purpose of this invention is to propose a connector for an inflation device compatible with several types of valve, for example that adjusts to bicycle-type valves and car-type valves without user intervention.

According to the invention, such a connector for an inflation device to a tyre valve comprises a hollow stopper to operate valve opening means and an elastically deformable seal. The connector is characterised in that the seal has a lip designed to immobilise the stopper during inflation, if the aforementioned valve is of a first type, or to deform and form a seal around the valve on inflation if the aforementioned valve is of a second type. The first type may correspond to a car-type valve and the second to a bicycle-type valve.

If the aforementioned valve is of the first type, the lip may also form a seal between an inner edge of the valve and the stopper, with an air intake from the inflation device to the valve being formed through the hollow stopper.

The connector may advantageously comprise a pipe, for air, in which the stopper is movably mounted. When no valve is connected, the lip surrounds the stopper in an initial position. The connector then also has means for retracting the stopper into the pipe on connection to the second type of valve, so that the aforementioned valve can be surrounded by the lip, and means for returning the stopper to its initial position when the aforementioned valve is withdrawn. The connector will preferably comprise means of deforming the seal.

Thus, the means to deform the seal may comprise a cover and a body between which the seal is arranged, the body being movable in relation to the cover, so that it can move closer to the cover, compressing the seal, or move away from the cover, decompressing the seal. This can be achieved through operating controls to move the body relative to the cover, for example using a cam lever, which can be locked in a first position in which the seal is not deformed or slightly deformed, or in a second position in which the seal is significantly deformed.

The seal may advantageously have a socket between a socket opening and the lip, such opening being designed to introduce the valve into the socket, and the socket being able to contract around the valve when the seal is deformed, in order to hold the aforementioned valve during inflation. Preferably, the seal is a volume of revolution around an axis of revolution and the body is movable in translation along this axis relative to the cover. The seal may also be provided with a convex tapered rear surface, on the opposite side to the seal socket opening, facing a concave tapered front surface on the body, so that when the body compresses the seal, the deformation of the seal is increased so that the lip contracts more tightly around the stopper or the valve, as the case may be.

Instead of being fitted directly to the tyre, the valve can be mounted on an air chamber or any other item capable of being inflated. Thus, whenever the term "tyre" is used below for the sake of simplicity, it should be taken to mean "tyre, air chamber or any other item capable of being inflated".

BRIEF DESCRIPTION OF THE DRAWINGS

The description below, which relates to non-limitative examples, contains other specific features and advantages of the invention.

In the appended drawings.

DESCRIPTION OF THE PREFERRED EMBODIMENTS

Figure 1:
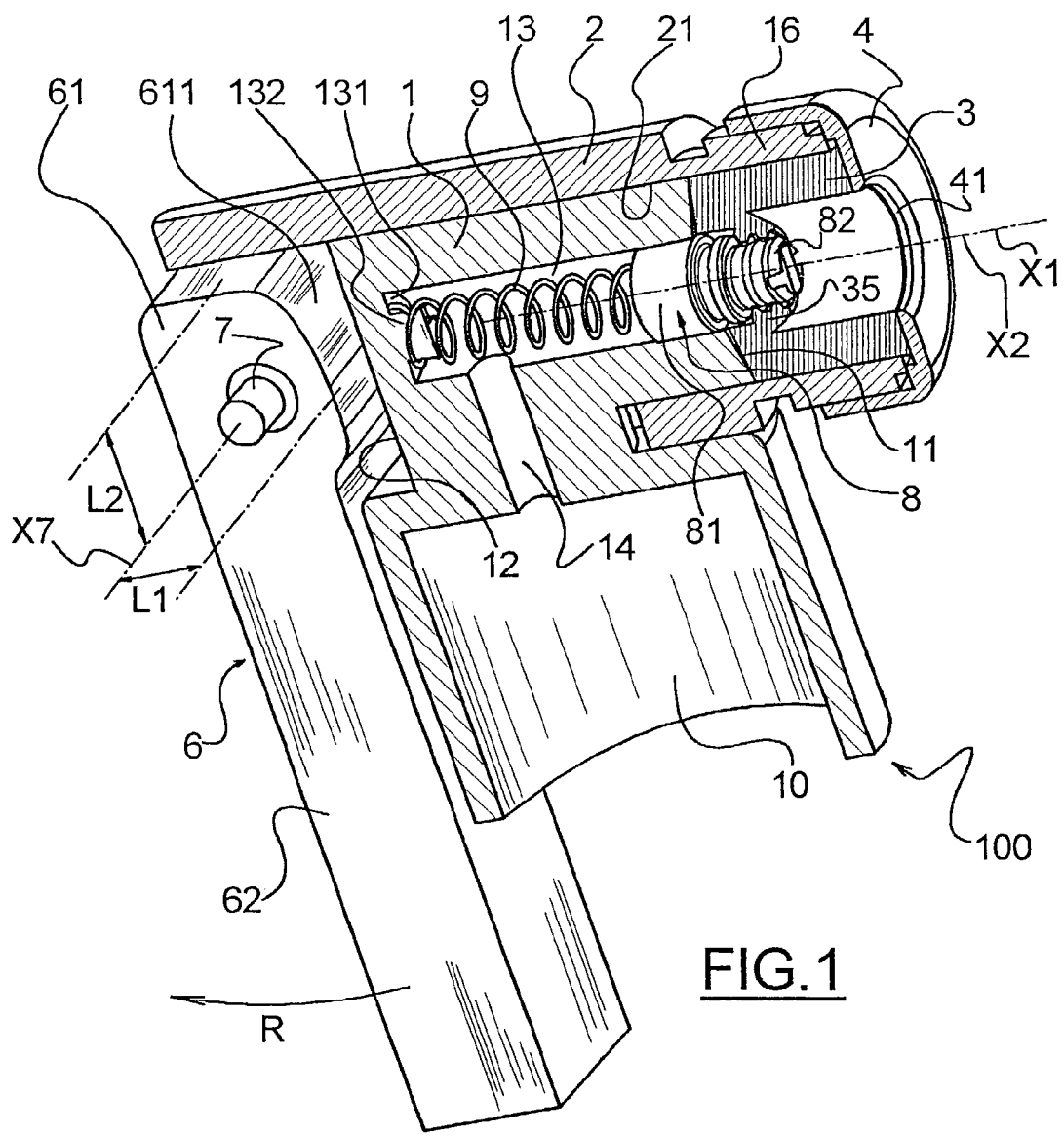
FIG. 1 is a perspective cross-section representation of a pump connector according to the invention.

FIG. 1 shows a pump connector 100. It is designed for connecting a pump to a valve 201, 202, through which compressed air produced by the pump can be introduced into the tyre. It allows for the pump to be connected either to a car-type valve 201 or a bicycle-type valve 202 (see FIGS. 3–9). This pump connector comprises an approximately cylindrical body 1 around an axis X1 and a housing 2. The housing 2 has a cylindrical inner surface 21 around an axis X2. The body 1 is mounted in the housing 2, fitted in and sliding on the inner surface 21 and along the axis X1 merged with the axis X2. A mounting area 10 extends transversally from the body 1 to allow for the pump connector 100 to be mounted on a piston/cylinder assembly (not shown), extending transversally along the axis X1, to form the bicycle pump.

The body 1 has a cylindrical pipe 13, with an axis X1 and a diameter D1, opened in a concave tapered front face 11 of the body and closed at the opposite end by a base 131. A channel 14, extending transversally to the axis X1, connects the pipe 13 and the mounting area 10. Thus, the pressurised air provided by the piston/cylinder assembly can be carried through the channel 14, the pipe 13 and then the front face 11 of the body 1.

The pump connector 100 also comprises a seal 3 mounted along the axis X1 between an annular cover 4 screwed to the housing 2 and the front face 11 of the body 1. The seal has a shape of revolution around the axis of the seal X3. The seal is mounted so that its axis of revolution X3 merges with the axis of revolution X1 of the body 1. The seal 3 is made from an elastically deformable elastomer type material. The cover has a circular opening 41 to introduce the valve to which the pump is to be connected into the seal.

A hollow stopper 8 is mounted so that it can slide in the pipe 13. A helical compression spring 9, fitted compressed between the hollow stopper 8 and the base 131, tends to push the hollow stopper 8 out of the pipe 13 through the front face 11. The seal 3 is designed to prevent the hollow stopper 8 from coming out of the pipe 13 through the front face 11. The pipe 13 has a stub 132, extending axially from the base 131 inside the pipe 13, around which the rear end of the spring 9 is wrapped to position it transversally relative to the axis X1.

The pump connector 100 also has a lever 6 that comprises a cam 61 and a handle 62. The lever is mounted so that it can pivot around a pivot 7 with an axis X7 perpendicular to the axis X1 and fixed relative to the housing 2. The cam 61 has a thrust surface 611, the distance from the axis X7 of the pivot of which varies progressively from a first distance L1 to a second distance L2, the second distance L2 being greater than the first distance L1. The thrust surface 611 is arranged so that when the handle 62 on the lever is lowered parallel to the piston/cylinder assembly, i.e. perpendicular to the axis of revolution X1 of the body 1, the first distance L1 is measured parallel to the axis X1, and when the handle of the lever is raised, parallel to the axis of revolution X1 of the body 1, the second distance L2 is measured parallel to the axis X1.

When the handle is moved in rotation R around the pivot 7 from its lowered position to its raised position, the thrust surface 611 presses against a rear face 12 of the body 1, on the opposite side from its front face 11 along its axis X1. Thus, the body 1 moves inside the housing 2 under the progressive thrust of the thrust surface 611 towards the cover 4 so that the seal 3 is compressed between the front face 11 of the body 1 and the cover 4.

Figure 2:
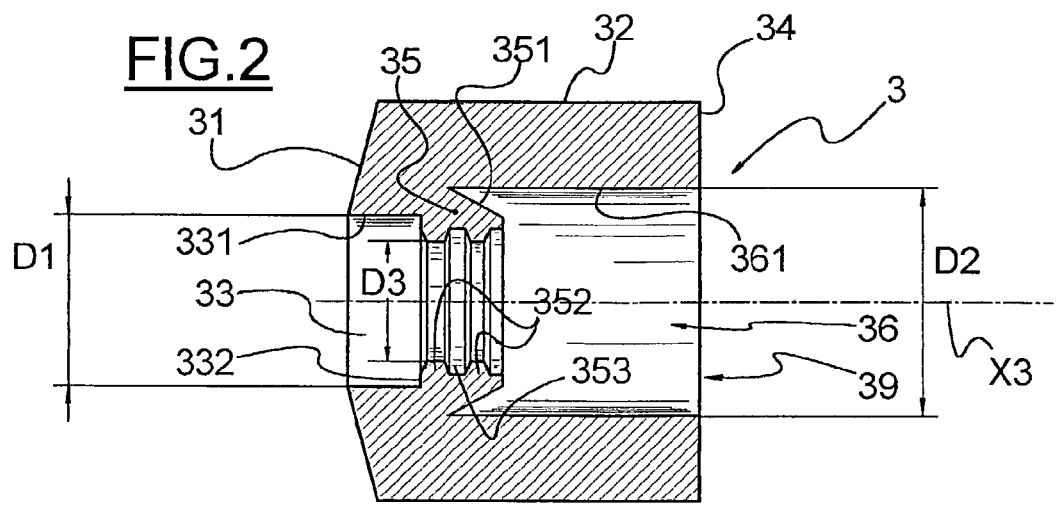
FIG. 2 is an axial cross-section of a seal for the connector in FIG. 1.

The seal 3 will now be described, with particular reference to FIG. 2. In FIG. 2, the seal is shown uncompressed and free of any external stress. The seal 3 has a cylindrical outer surface 32. This surface 32 is designed so that it can slide on the inner surface 21 of the housing 2. The seal is axially delimited by a convex rear compression surface 31, serving as a bearing surface for the front face 11 of the body 1, and to the front by a bearing surface 34 serving as a bearing for the seal 3 on the cover 4. The compression surface 31 is tapered, with the same dimensions as the tapered front face 11 of the body 1. The bearing surface 34 is a flat annular surface, perpendicular to the axis X3 of the seal, the outer diameter of which is the same as the diameter of the outer surface 32 and the inner diameter D2, approximately the same as the diameter of the opening 41 of the cover 4, is the same as the diameter of a socket opening 39 to introduce the valve into the seal 3. The diameter D2 is approximately the same as the diameter of the stem of a car-type valve 201 (approx. 7.7 mm).

The seal 3 has an axial hole between the compression surface 31 and the bearing surface 34 with a complex shape of revolution of axis X3, which can be broken down into three successive areas. A first area 33 is an axial extension of the pipe 13. This first area is made up of a cylindrical extension surface 331, with the same axis and the same diameter D1 as the pipe 13. This extension surface extends between the compression surface 31, of which it defines an inner diameter D1, and an annular stop surface 332, extending transversally to the extension surface 331 in the direction of the axis X3. This stop surface 332 limits the protrusion of the stopper 8 through the front face 11 of the body 1. A second area is made up of a lip 35 that extends towards the socket opening 39, inside the third area 36 defined by a socket surface 361, extending from the lip to the bearing surface 34, of which it defines the inner diameter D2.

The lip 35 is defined on its outer side by a slightly tapered lip surface 351 extending from the socket surface 361 to its extremity opposite the opening and forming an acute angle with the socket surface 361. The lip 35 is defined on its inner side by a complex surface extending between the inner perimeter of the stop surface 332 and the inner perimeter of the lip surface 351. This complex surface has two annular contours 352 with a trapezoidal section, extending radially towards the axis X3, flanking a groove 353, also with a trapezoidal section. The contours 352 define the inner diameter D3 of the lip. The diameter D3 is approximately the diameter of the stem of a bicycle-type valve 202 (approximately 5.2 mm). Any thickness of the lip, measured transversally to the axis X3, is small relative to lengths of its inner and lip surfaces, measured axially. In particular, the thickness of the lip is significantly less than the thickness of the seal measured between its outer surface 32 and its socket surface 361 or between its outer surface 32 and its extension surface 331. The lip is therefore very flexible, allowing it to deform more easily than the thicker parts of the seal.

Figure 6:
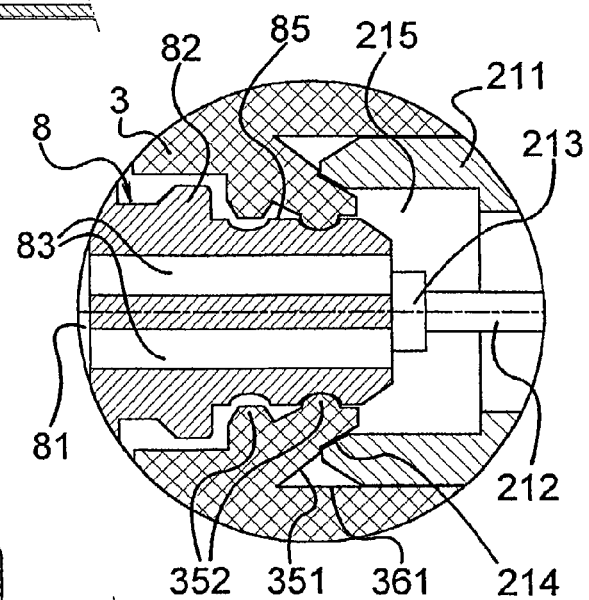
FIG. 6 is a detail of FIG. 5, with the car-type valve being connected to the device.
Figure 5:
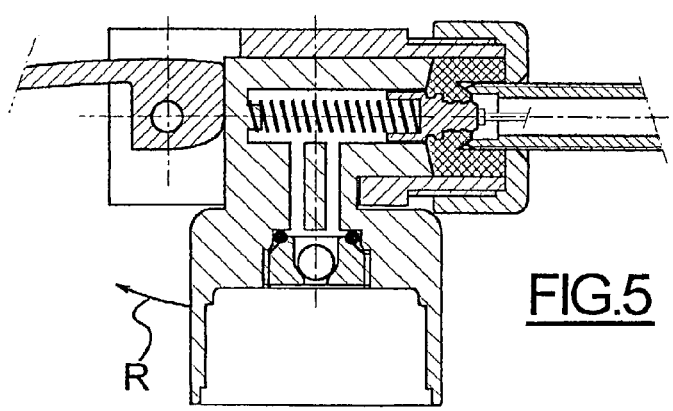

The stopper 8 will now be described, with particular reference to FIGS. 6 and 1. The hollow stopper has a hollow cylindrical guide 81, with an outer diameter D1, allowing for the stopper to slide in the pipe 13. The front end of the spring 9 is lodged inside the guide and is positioned transversally relative to the axis X1 of the body 1. The hollow stopper 8 also has a nose 82, extending from the hollow guide 81 towards the opening 41 in the cover 4. The nose 82 has channels 83 that open on one side onto the inside of the hollow guide 81 and on the other through a front surface of the nose. In the configuration in FIG. 1, that is, with the pump not connected to any valve and the lever 6 being lowered, the lip 35 is located around the nose 82 of the stopper 8.

It will also be noted that in the configuration in FIG. 1, the pressurised air provided by the piston/cylinder assembly first travels through the channel 14, passes up the pipe 13 and then enters the stopper 8 through the hollow guide 81, entering the channels 83 to exit the hollow stopper in the socket 36 before being expelled from the pump through the openings 39 and then 41, thus forming a circuit for the circulation of the air in the pump connector. The cover 4 is screwed to a head 16 on the housing 2. It is therefore possible to adjust the distance between the cover and the axis X7 of the pivot by screwing the cover 4. This distance is advantageously chosen so that when the lever 6 is lowered, the body and the seal 3 are locked between the cam 61 and the cover 4, whilst ensuring that the pressure exerted axially on the seal 3 is zero or low, i.e. the seal 3 is not deformed or slightly deformed. Thus, the contact between the front bearing surface 34 of the seal 3 and the cover forms a seal around the opening 41 in the cover 4 and the contact between the compression surface 31 of the seal 3 and the front face 11 of the body 1 forms a seal on it. Thus, even when the lever is lowered, the circuit is airtight along its length for the circulation of the air in the pump connector.

The operation of the pump connector 100 when it is connected to a car-type valve 201 will now be described with reference to FIGS. 3 to 6. The car-type valve 201 is shown partly on the Figures. It is fitted onto a tyre for the inflation of the said tyre. It has a stem 211 that defines a passage 215 for the air between the outside of the tyre and the tyre. The car-type valve 201 has a valve flap (not shown) to prevent the deflation of the tyre through the passage. The car-type valve 201 has, along the axis of the stem, in the air passage, a pin 212 that is used to control the opening of the flap by pressing on one end 213 of the pin 212, accessible from outside the stem. The stem 211 has a conical inner chamfer 214 around the passage 215, at the end opening onto the outside of the tyre, that is, on the inner edge of this end.

Figure 3:
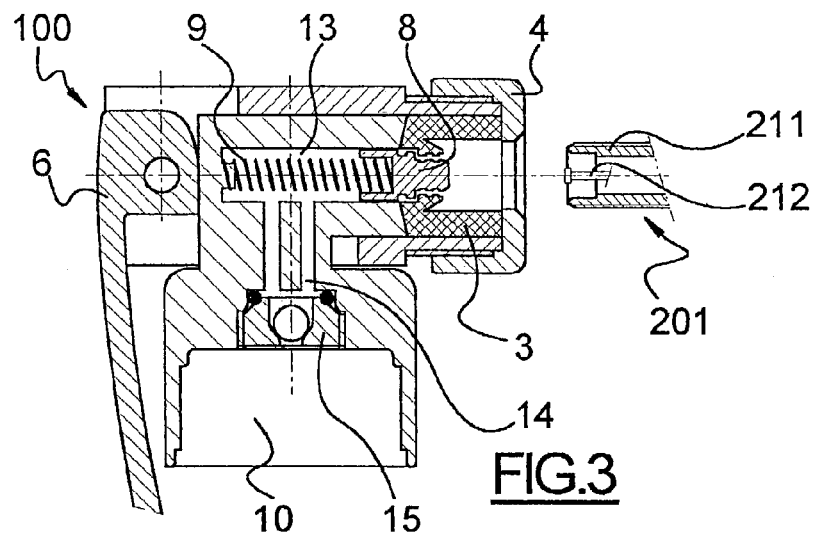
FIGS. 3 to 5 are cross-section representations of stages of the connection of the device in FIG. 1 to a car-type valve.
Figure 4:
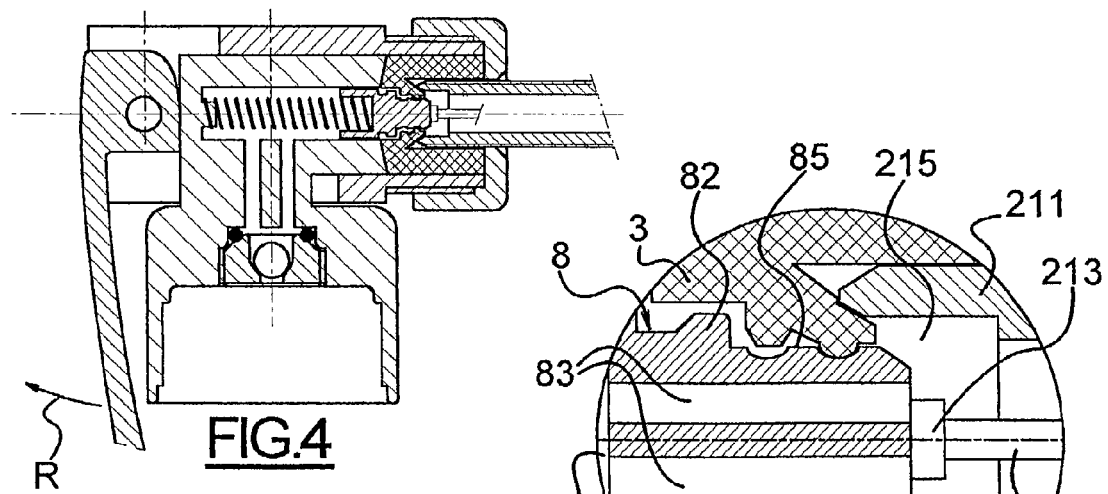

As shown in FIG. 3, when the stem 211 is placed in front of the connector 100, the connector is in the position shown in FIG. 1, with the lever 6 lowered. As shown in FIG. 4, the stem 211 is then introduced along the axis X1 through the openings 41 and then 39 into the socket 36 in the seal 3. The stem fits between the lip 35 and the socket surface 361, and the chamfer 214 presses against the lip surface 351, which tends to push the lip 35 towards the axis X3 of the seal, contracting and thus immobilising the nose 82 of the stopper 8, whilst the front surface of the stopper 8 comes into contact with the end 213 of the pin 212, which is pushed axially into the passage 215. Thus, the imnnobilisation of the stopper allows for the pin 212 to be operated. The valve flap is thus open, connecting the inside of the tyre and the air circulation circuit 83, 81, 13, 14 in the connector 100. If the pressure in the tyre is greater than the pressure in the pump cylinder, a ball valve 15 between the circuit and the cylinder is held closed until the pressure in the cylinder becomes greater than the pressure in the tyre on pumping.

When the lever 6 is raised, moving the body 1 and compressing the seal 3 between the body 1 and the cover 4, several approximately simultaneous actions occur. The first action is the reinforcement of the action of the stopper 8 on the end 213 of the pin by increasing the compression of the spring 9 between the base 131, which moves with the body 1, and the stopper 8, which remains approximately immobile. By compressing the seal 3, the conical front face 11 of the body 1, pressing against the compression surface 31 of the seal, which is also conical, tends to deform the seal so that it contracts radially around its axis X3 as well as axially. Thus, the second action is the radial and axial deformation of the lip 35, gripped between the chamfer 214 and the nose 82 of the stopper 8. It must be noted that the nose 82 has on its outer surface shapes that complement the shapes 352, 353 of the complex surface of the lip 35, which presses against it and deforms it. This thus ensures that the stopper 8 is held in place and forms a seal between the air circuit and the valve during inflation, i.e. the contours 352 interlock with complementary grooves on the outer surface 85 of the nose 82 and hold onto it, and the lip 35, gripped between this outer surface 85 and the chamfer 214, serves as a seal. By compressing the seal 3, the third action is the contraction of the socket surface 361 around the stem 211, ensuring that the valve is held firmly during inflation and forming another seal between the air circuit and the valve during inflation. This further seal may be sufficient, and the seal provided by the lip is in this case only supplementary.

At the end of inflation, to release the car-type valve 201, the lever 6 must simply be lowered so that the seal elastically returns to its shape and the connector 100 is removed from the valve.

The operation of the pump connector 100 when it is connected to a bicycle-type valve 202 will now be described with reference to FIGS. 7 to 9. The bicycle-type valve 202 is shown partly on the figures. It is fitted onto a tyre for the inflation of the said tyre. It comprises a stem 221 that defines a passage for the air between the outside of the tyre and the tyre. The bicycle-type valve 202 has a valve flap that prevents the deflation of the tyre through the passage. The bicycle-type valve 202 has along the axis of the stem, in the air passage, a pin 222 that is used, by its being pushed into the stem, to control the opening of the flap by pressing on one end 223 of the pin 222, accessible from outside the stem. A nut 225, screwed onto the pin, is used to lock the pin by pressing against the stem so that if the end 223 is pressed accidentally, the pin cannot control the opening of the valve flap, thus causing the accidental deflation of the tyre. The nut 225 must therefore be unscrewed to allow the air to circulate in the passage with a view to inflating the tyre. It must be noted that the nut is configured to allow for the air to pass between the passage in the stem 221 and the outside of the tyre when the pin is pushed in and the nut is pressing against the stem.

Figure 7:
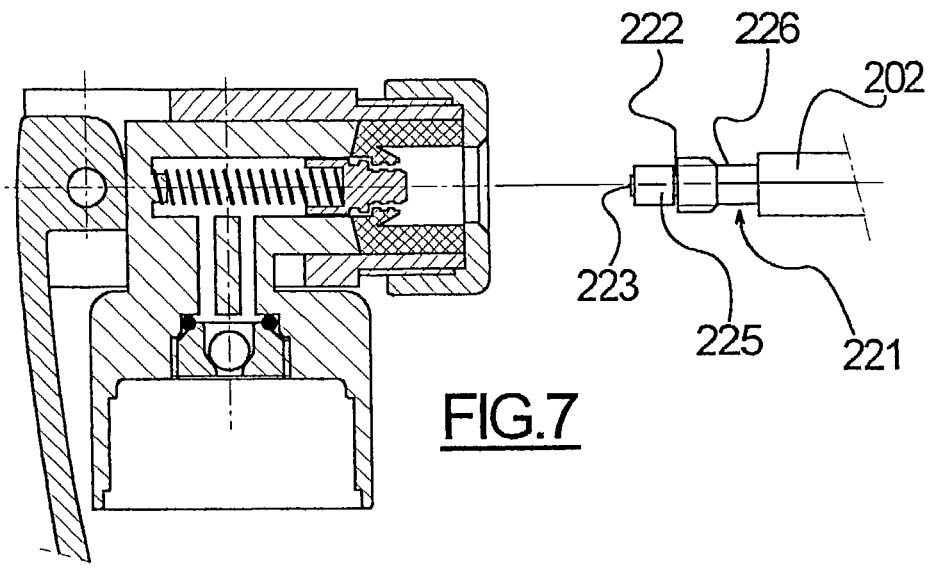
FIGS. 7 to 9 are cross-section representations of stages of the connection of the device in FIG. 1 to a bicycle-type valve.
Figure 8:
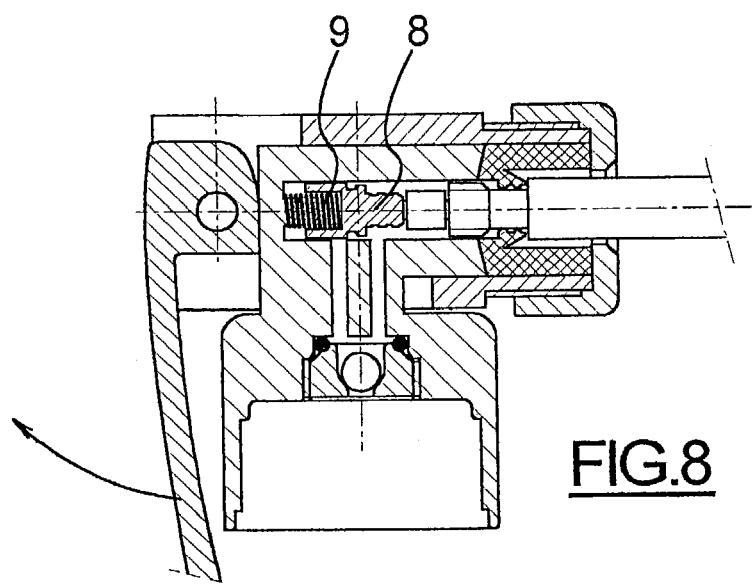

As shown in FIG. 7, when the stem 221 is placed in front of the connector 100, the connector is in the position in FIG. 1, with the lever 6 lowered. As shown in FIG. 8, the stem 221 is then introduced along the axis X1 through the openings 41 and then 39 into the socket 36 in the seal 3. The end 223 of the pin 222 comes into contact with the front surface of the stopper. As the stem 221 enters the socket 36, the pin 222 is gradually pushed in so that the flap on the bicycle-type valve 202 is gradually opened. When the nut 225 presses against the stem 221, the pin, locked in this way, is not pushed any further into the stem. Whilst the stem 221 continues to enter the socket 36, and then beyond between the lip 35 on the seal 3, the end 223 of the pin gradually pushes the stopper back into the pipe 13, until the spring is completely compressed, thus stopping the entry of the stem 221. The pump connector 100 is designed so that in this position, shown in FIGS. 8 and 9, the stopper is in the pipe 13, beyond the front surface 11 of the body 1.

A new air circuit 13, 14 is established in the connector 100, placing the air inside the tyre in contact with the air inside the pipe 13, through the nut 225. If the pressure in the tyre is greater than the pressure in the pump cylinder, the ball valve 15 is held closed until the pressure in the cylinder becomes greater than the pressure in the tyre on pumping.

When the lever 6 is raised, moving the body 1 and compressing the seal 3 between the body 1 and the cover 4, this allows for the lip to contract around the stem 221 of the bicycle-type valve, in particular through the action described above of the conical surfaces of the body 1 and the seal 3.

Figure 9:
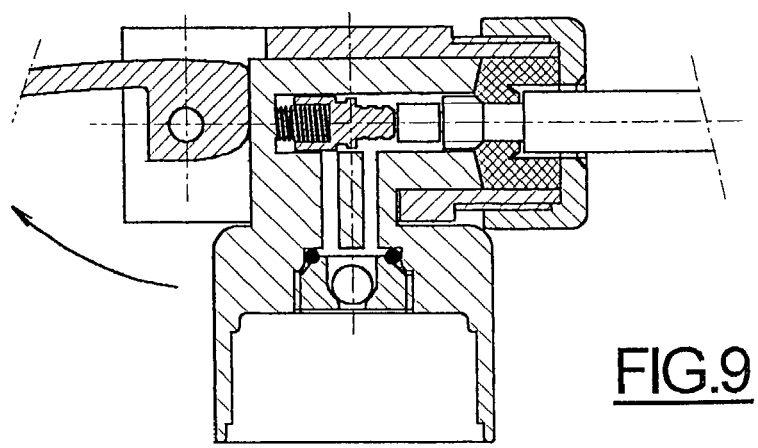

The pump connector 100 is designed so that in this position, shown in FIG. 9, the lip 35 contracts around a favourable area 226 of the stem 221 to seal it during inflation. In particular, it is ensured that the lip does not contract around the thread used to screw on a conventional flexible bicycle pump connector of the prior art. Preferably, the inner diameter D3 of the lip and the inner diameter of the area 222 must be approximately the same. When contracted in this way, the lip forms a seal between the pipe 13 and the bicycle-type valve 202, as well as holding the valve in place, during inflation. The stopper 8, still locked between the spring 9 and the end 223 of the pin 222 in the valve, is used to hold open the bicycle-type valve flap to allow the pressurised air provided by the bicycle pump to enter the tyre.

At the end of inflation, to release the bicycle-type valve 202, the lever 6 must simply be lowered and the connector 100 removed from the valve.

It can thus be seen that the pump operator does not have to concern himself with the type of valve, car-type or bicycle-type, on the tyre. The pumping operation is the same whatever the type of valve. This operation successively involves the pushing of the valve into the pump connector, the raising of the lever, pumping, and finally the release of the valve by lowering the lever.

Of course, the invention is not limited to the examples described above, and numerous adjustments can be made to these examples without leaving the scope of the invention.

Such a connector is not limited to connection to car-type or bicycle-type valves of the types described above, but can also be fitted to other types of existing or future valves. In particular, the diameters D1, D2 and D3 can be different depending on the diameters of the valves to which the pump is to be connected. Nor is it limited to use as a pump connector on bicycle pumps alone.

Instead of mounting the connector on a piston/cylinder assembly on a manual pump, it can also be mounted directly on a flexible hose on a compressed air supply station such as those available at service stations.

The operating controls can also be made up of other means than a cam lever, such as for example a screw to push the body into the housing to a greater or lesser extent.

The seal may partly or fully consist of materials other than an elastomer material, and in particular a thermoplastic material or rubber.

It is possible for the cover not to be screwed onto the housing, but to form an integral part of it.

The invention clamed is:

1. Connector (100) for connecting an inflation device to a valve (201, 202), comprising a hollow stopper (8) to operate valve opening means (212, 222), an elastically deformable seal (3), characterised in that the seal has a lip (35) designed to immobilise the stopper during inflation, if the aforementioned valve (201) is of a first type, and to deform to form a seal around (226) the valve (202) during inflation, if the valve is of a second type, an air intake from the inflation device to the valve being formed through the hollow stopper, characterised in that the lip also forms a seal between an inner edge (214) of the valve (201) and the aforementioned stopper, if the valve is of the first type.

2. Connector according to claim 1, characterised in that it has a pipe (13) for air in which the stopper (8) is movably mounted.

3. Connector according to claim 2, characterised in that when no valve is connected, the lip surrounds the stopper in an initial position, and has means (9) to retract the stopper in the pipe when a valve (202) of the second type is connected, so that the aforementioned valve can be surrounded by the lip, and means (9) to return the stopper to its initial position when the aforementioned valve (202) is withdrawn.

4. Connector according to claim 1, characterised in that the seal has a socket (36) between a socket opening (39) and the lip, the aforementioned opening being designed to introduce the valve into the socket, and the aforementioned socket being capable of contracting around the valve when the seal is deformed, to hold the aforementioned valve during inflation.

5. Connector according to claim 1, characterised in that it comprises means (6,1,4) to deform the seal.

6. Connector according to claim 5, characterised in that the means to deform the seal comprise a cover (4) and body (1) between which the seal is arranged, the body being movable relative to the cover, so that it can move closer to the cover, compressing the seal, or move away from the cover, decompressing the seal.

7. Connector according to claim 6, characterised in that the means to deform the seal also comprise operating controls (6) to move the body relative to the cover.

8. Connector according to claim 7, characterised in that the operating controls (6) are constituted by a cain lever that can be locked in a first position in which the seal is not deformed or slightly deformed, or in a second position in which the seal is significantly deformed.

9. Connector according to claim 6, characterised in that the seal is a volume of revolution around an axis of revolution (X3) and the body is movable in translation along the aforementioned axis relative to the cover.

10. Connector according to claim 9, characterised in that the aforementioned seal has a convex tapered rear surface (31), on the opposite side to the socket opening (39) of the seal, facing a concave tapered front surface (11) of the body (1).

11. Connector according to claim 6, characterised in that the seal has an axial hole inside which the lip extends towards the opening in the seal.

12. Connector according to claim 6, characterised in that the lip has contours, designed to hold onto complementary contours on the stopper, in order to hold the stopper when the connector is connected to a valve of the first type.

13. Connector according to claim 6, characterised in that the inner diameter (D3) of the lip is approximately the same as the outer diameter of a valve of the second type.

14. Connector according to claim 5, characterised in that the socket is comprised in the hole, which is cylindrical and has an inner diameter (D2) approximately the same as the outer diameter of a valve of the first type.

15. Connector according to claim 1, characterised in that, when the connector is connected to a valve of the first type, the contraction of the lip immobilises the stopper so that the aforementioned stopper can operate the opening means.

16. Connector according to claim 1, characterised in that the seal consists of an elastomer or thermoplastic material or rubber.

17. Connector according to claim 1, characterised in that the first type of valve corresponds to a car-type valve (201).

18. Connector according to claim 1, characterised in that the second type of valve corresponds to a bicycle-type valve (202).

19. Connector (100) for connecting an inflation device to a valve (201, 202), comprising:
   a hollow stopper (8) operating a valve opening means (212, 222); and
   an elastically deformable seal (3), wherein,
   the seal has a lip (35) configured
   i) to immobilise the stopper from backing during inflation when the valve (201) is of a first type, including the lip forming a seal between an inner edge (214) of the valve (201) and the stopper, and
   ii) to deform to form a seal around (226) the valve (202) during inflation, if the valve is of a second type, and an air intake from the inflation device to the valve being formed through the hollow stopper.

20. Connector (100) for connecting an inflation device to a valve (201, 202), comprising:
- a hollow stopper (8) operating a valve opening means (212, 222); and
- an elastically deformable seal (3), wherein,
- the seal has a lip (35) configured
  - i) to immobilise the stopper from backing during inflation when the valve (201) is of a first type, including the lip forming a seal between an inner edge (214) of the valve (201) and the stopper so that the lip is pressed around the stopper by the inner edge of the valve, and
  - ii) to deform to form a seal around (226) the valve (202) during inflation, if the valve is of a second type, and
- an air intake from the inflation device to the valve being formed through the hollow stopper.

* * * * *